United States Patent
Zusi

(10) Patent No.: US 7,243,516 B2
(45) Date of Patent: Jul. 17, 2007

(54) AUTOMATED MACHINE SETUP WITH MODULAR TOOLING

(76) Inventor: Christopher J. Zusi, 717 Kennedy Rd., Leeds, MA (US) 01053

( * ) Notice: Subject to any disclaimer, the term of this patent is extended or adjusted under 35 U.S.C. 154(b) by 172 days.

(21) Appl. No.: 10/859,899

(22) Filed: Jun. 3, 2004

(65) Prior Publication Data

US 2005/0016235 A1    Jan. 27, 2005

Related U.S. Application Data

(60) Provisional application No. 60/475,681, filed on Jun. 4, 2003.

(51) Int. Cl.
*B21C 51/00* (2006.01)

(52) U.S. Cl. ............ 72/20.1; 72/15.1; 72/20.3; 72/444; 72/712; 29/753; 29/863

(58) Field of Classification Search ............ 72/20.1, 72/20.2, 20.3, 21.4, 420, 421, 443, 444, 712, 72/15.1; 29/564.4, 747, 753, 863
See application file for complete search history.

(56) References Cited

U.S. PATENT DOCUMENTS

| | | | |
|---|---|---|---|
| 4,025,999 A | 5/1977 | Wolyn et al. | 29/753 |
| 4,313,258 A | 2/1982 | Kindig et al. | 29/596 |
| 4,653,160 A | 3/1987 | Thorkildsen et al. | 29/33 M |
| 4,663,822 A | 5/1987 | Blaha et al. | 29/564.4 |
| 4,699,027 A | 10/1987 | Guyette et al. | 81/9.51 |
| 4,879,926 A | 11/1989 | Wollermann et al. | 81/9.51 |
| 4,916,810 A * | 4/1990 | Yeomans | 29/863 |
| 5,484,114 A | 1/1996 | Santandrea et al. | 242/7.03 |
| 5,594,980 A * | 1/1997 | Tamura et al. | 29/33 M |
| 5,740,602 A | 4/1998 | Peterson et al. | 29/748 |
| 5,913,934 A * | 6/1999 | Inoue et al. | 72/442 |
| 6,047,579 A | 4/2000 | Schmitz | 72/15.1 |
| 6,101,857 A | 8/2000 | Fox et al. | 72/15.1 |
| 6,169,934 B1 * | 1/2001 | Nakayama et al. | 700/213 |
| 6,209,189 B1 * | 4/2001 | Murata | 29/564.4 |
| 6,212,924 B1 | 4/2001 | Meisser | 72/21.4 |
| 6,301,772 B1 | 10/2001 | Cheng | 29/566.4 |
| 6,327,775 B1 * | 12/2001 | Oishi et al. | 29/751 |
| 6,344,018 B1 | 2/2002 | Aizawa | 483/29 |
| 6,418,769 B1 | 7/2002 | Schreiner | 72/15.1 |
| 6,490,495 B1 | 12/2002 | Murata | 700/117 |
| 6,530,257 B2 | 3/2003 | Ooji et al. | 72/420 |
| 2001/0025412 A1 | 10/2001 | Burger | 29/748 |

* cited by examiner

*Primary Examiner*—Ed Tolan
(74) *Attorney, Agent, or Firm*—Weigarten, Schurgin, Gagnebin & Lebovici LLP

(57) ABSTRACT

Apparatus and a method for establishing setup parameters for use in a machine. In one embodiment a tooling component is removably mountable to a host machine. The tooling component includes a memory that contains information defining setup parameters for the host machine for use with the tooling component. A controller associated with the host machine reads the information from the memory and configures the host machine based on the information read from the memory. In another embodiment, an information carrying tag, is associated with the tooling component. The information carrying tag is read and the identifying information obtained from the tag is used by a controller to select a set of setup parameters from one or more sets of setup parameters stored in a storage device accessible by the controller. A mechanism is provided to precisely position the adapter on the base plate for the host machine to minimize variations in production using the setup parameters derived from the stored information.

21 Claims, 3 Drawing Sheets

AUTOMATED MACHINE SETUP WITH MODULAR TOOLING

CROSS REFERENCE TO RELATED APPLICATIONS

The present application claims priority under 35 U.S.C. 119(e) of U.S. Provisional Patent Application titled AUTOMATED TOOLING SETUP IN MODULAR TOOLING, Application No. 60/475,681 filed Jun. 4, 2003.

STATEMENT REGARDING FEDERALLY SPONSORED RESEARCH OR DEVELOPMENT

Not Applicable

BACKGROUND OF THE INVENTION

The present invention relates generally to machine tooling and more specifically to method and system setting up machine tooling in advance of use.

Crimping a terminal to a wire requires the use of a "crimping die" or "applicator" in conjunction with a press, semi-automatic stripper-crimper, or fully automatic cut-strip-terminate machine. Both the stripper-crimper and the cut-strip-terminate machines incorporate mechanisms to strip wire insulation prior to actuating the applicator to produce a completed wire termination. Removing the wire's insulation or "stripping" has specific parameters that need to be set in order to achieve good results that leave a clean accurate strip without damage to the conductor. The basic stripping parameters, such as strip length, strip position and wire gauge are dictated by a combination of the dimensions of the terminal to be applied and the size of the wire. Additional stripping parameters such as delta wayback and trimming, etc. can be employed to produce improved results in the event the wire is particularly difficult to work. Semi-automatic and fully automatic machines are commonly used to accomplish wire stripping, however, such machines typically require a machine operator to manually adjust the stripping parameters, program them into the machine's memory, or recall them from the machine's memory in order to properly setup the machine for the intended terminal and wire combination. Such machines can typically store from hundreds to many thousands of stripping parameters for the multitude of applicators that a manufacturer might use in various manufacturing processes. Due to the complexity of setup and the number of possible applicators involved, setup and programming by an operator can be a time consuming process. Additionally, if the wrong stripping parameters are set and the machine is allowed to run, defective product may be produced, materials may be wasted and production time may be lost. Eliminating the manual programming process during the setup of the applicator would be beneficial since this would reduce setup times and would eliminate a source of potential errors in the manufacturing process.

BRIEF SUMMARY OF THE INVENTION

In accordance with one embodiment of the present invention, improved tooling for use in a host machine is disclosed. The tooling is removably mountable to the host machine. In one embodiment, the tooling comprises an applicator, such as a crimping die and the host machine comprises a crimping press, stripper-crimper machine or a cut-strip-terminate machine. The applicator includes an onboard memory that contains the setup parameters associated with the specific applicator. The onboard memory includes different setup parameters that are applicable to different host machines into which the removable tooling may be installed. The setup parameters are used by the host machine to configure the host machine to perform a pre-specified function in a manufacturing process, e.g. a wire stripping and termination process.

In one embodiment, a controller associated with the host machine is electrically coupled to the memory via a touch probe. The controller includes a processor, at least one storage device including a memory, and an application program that is executed out of the memory. The controller may be provided internal to the host machine or external to the host machine and communicably coupled thereto. The controller reads the parameters associated with the applicator directly from the applicator's onboard memory via the touch probe, via one or more conductive links coupled through a connector, or via a wireless link such as an infrared or a RF wireless link. The controller configures the host machine in response to the setup parameters obtained from the memory associated with the applicator.

In another embodiment of the invention, the applicator includes applicator-identifying information, such as a bar code or an RFID tag or any other suitable identifying indicia. The identifying information is scanned by a bar code reader, RFID tag scanner or another appropriate reader and the controller associated with the host machine uses the identifying information to select one set of setup parameters from one or more sets of setup parameters from a memory or storage device that is accessible by the controller.

To assure that the applicator is precisely positioned with respect to the host machine, spring loaded locator pins or fasteners are provided to precisely locate the applicator on the host machine.

Other features, aspects and advantages of the presently disclosed invention will be apparent to those of ordinary skill in the art from the Detailed Description of the Invention that follows.

BRIEF DESCRIPTION OF THE SEVERAL VIEWS OF THE DRAWINGS

The invention will be more fully understood by reference to the following Detailed Description of the Drawings in conjunction with the Drawings of which.

DETAILED DESCRIPTION OF THE INVENTION

U.S. Provisional Patent Application, Application No. 60/475,681, titled AUTOMATED TOOLING SETUP IN MODULAR TOOLING, filed Jun. 4, 2003 is hereby incorporated by reference.

In accordance with the present invention, an improved removable tooling component for use with a host machine is disclosed. The tooling component facilities rapid and reliable setup of the host machine. The tooling component is removably mountable to the host machine. In one embodiment, a memory is physically associated with the tooling component. The tooling component memory is preferably a non-volatile memory that contains setup parameters for the applicable for use by the host machine with the particular tooling component. The tooling component memory is readable by a controller associated with the host machine. The controller uses the setup parameters read from the memory to configure the host machine for use with the respective component. More specifically, wire processing machines known in the art are operative in response to the specification of specific setup parameters to perform an operation that uses the specific setup parameter to define the operation. For example, in a cut-strip-terminate machine, if an operator specifies via a input interface a particular strip length for a wire, the cut-strip-terminate machine, in response to that input adjusts the relative positioning of the stripping device with respect to the wire to achieve the specified strip length. In one embodiment, the present system uses information obtained from a memory affixed to the removable tooling component as the input instead of the input specified by the operator as in known systems. Additionally, a means for accurately positioning the tooling component with respect to the host machine is disclosed to assure that the setup parameters that are employed result in repeatable and precise processing during a production run.

Figure 1:
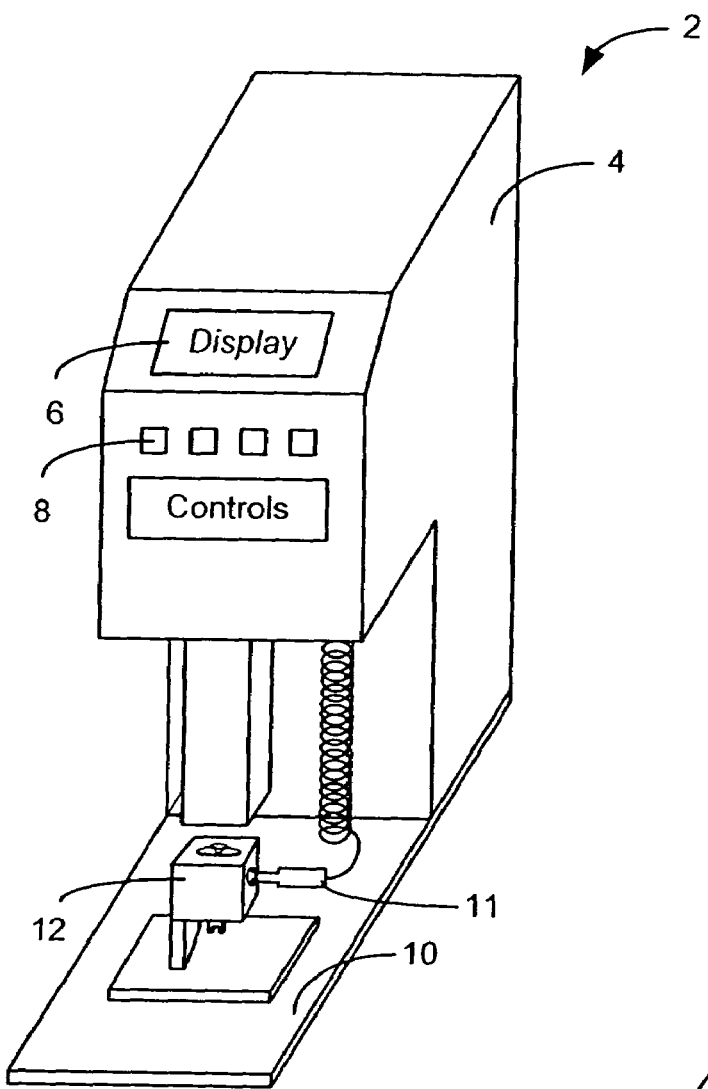
FIG. 1 is a perspective view of a system operative in accordance with the present invention that includes a host machine and a removable tooling component.

A host machine and tooling component operative in accordance with the present invention are depicted in FIG. 1. Referring to FIG. 1, the host machine 2 includes a housing 4 that includes a display 6 and controls 8. The host machine 2 may be of many forms but is illustrated in FIG. 1 as a stripper-crimper machine that is used for wire stripping and wire termination. While the present invention is illustrated in terms of a machine employed for wire termination it should be appreciated that the presently disclosed invention may be applicable to any host machine that is useable with a removable tooling component where it is desirable to establish setup parameters for the host machine to operate with the removable tooling component. Additionally, as will be discussed subsequently, the presently disclosed system may be employed in the setup of manufacturing machines and processes that do not employ removable tooling.

The host machine tool 2 includes a controller (not shown) which may be within the housing 4 of the host machine 2 or alternatively, coupled to the logic and controls within the housing of the host machine 2 via appropriate cabling. The host machine 2 further includes a machine base 10.

Figure 2:
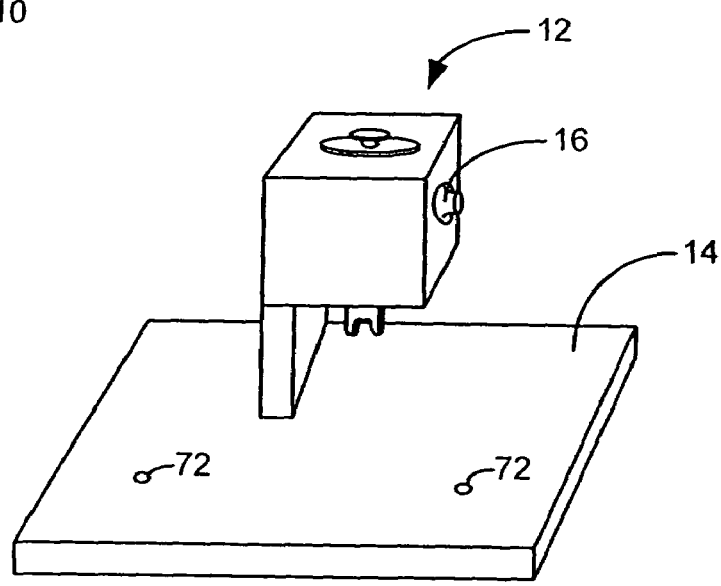
FIG. 2 is an enlarged perspective view of the removable tooling component depicted in FIG. 1.
Figure 6:
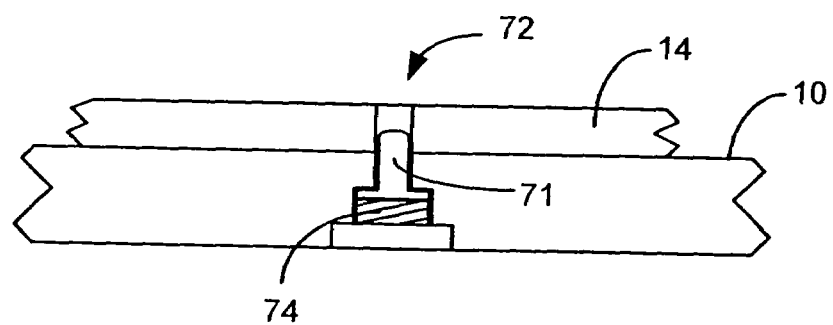
FIG. 6 is a side cross-sectional view depicting a locator pin employed to precisely locate the removable tooling component with respect to the host machine.

In one embodiment, the host machine 2 also includes a removable tooling component 12, which is depicted as an applicator or crimping die. The applicator 12 is removably mounted to the machine base 10 of the host machine 2 in the illustrated embodiment although it is recognized that the applicator 12 may be otherwise mounted to the host machine 2. The removable component or applicator 12 is shown in an enlarged view in FIG. 2 and includes a component base 14 that is mountable to the base 10 of the host machine 2. The component base 14 is precisely positioned with respect to the host machine base 10 via precisely located fasteners or locator pins 71 (see FIG. 6) as subsequently discussed in greater detail. The removable component 12 specifically adapts the host machine 2 to perform a predetermined function, such as a wire strip and crimp function or any other suitable function that may be performed by the removable tooling component 12.

A plurality of removable components 12 or applicators may be inventoried by a manufacturer to adapt the host machine 2 for different production requirements. A selected one of the removable components 12 or applicators is mounted to the host machine 2 to configure the host machine 2 to perform the desired production function.

To facilitate the reliable set-up of the host machine 2, in one embodiment, a non-volatile memory device 16 is mounted to the removable component 12 or applicator. A simplified block diagram depicting exemplary electronics associated with one embodiment of the presently disclosed system is depicted in FIG. 3.

Figure 3:
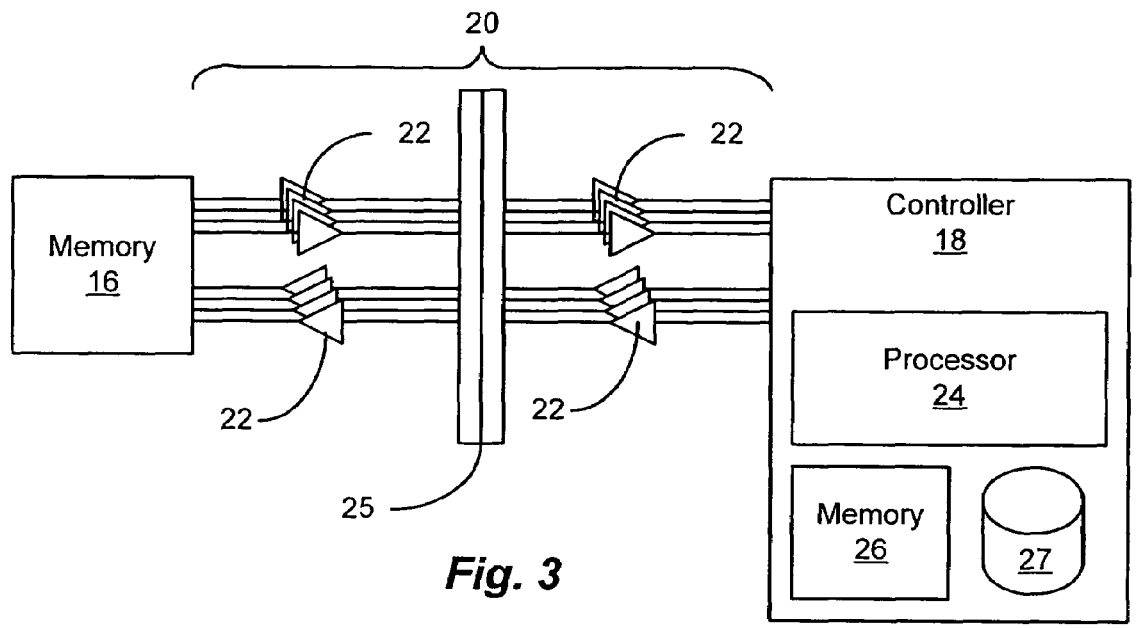
FIG. 3 is a block diagram depicting a memory coupled to a controller via buffers and a connector.

Referring to FIG. 3, the memory 16 is mounted to the removable component 12. The memory 16 is preferably a non-volatile memory such as a read only memory, a FLASH RAM or any other suitable memory for retaining stored information. For example, a digital memory such as Dallas Semiconductor's iButton™ memory may be desirable for use in harsh environments. The memory 16 is communicably coupled to a controller 18 via an interface 20 for signaling between the memory 16 and the controller 18. The controller 18 includes at least one processor 24 that is operative to execute an application program stored in a controller memory 26.

In the embodiment depicted in FIG. 3, the interface 20 includes buffers 22, and connector 25 to permit the memory 16 to be removably coupled to the controller 18. When a connector is employed, the interface may be implemented either as a serial or a parallel communications link. When a touch probe 11 (See FIG. 1) is employed to conductively couple the controller 18 to the memory 16, data is serially communicated from the memory 16 via the interface 20 to the controller 18. In the embodiment illustrated in FIG. 1, the memory 16 is a storage device such as an iButton(™) memory manufactured by Dallas Semiconductor, Inc. that is readable via the touch probe 11. The iButton memory comprises a memory device and logic enclosed within a metallic container. When the conductive end of the touch probe 11 probe is brought into contact with the metallic container, logic within the memory 16 detects the conductive contact and the contents of the memory 16 are serially communicated via the touch probe 11 to the controller 18.

In an alternative embodiment, the interface 20 is provided as a wireless interface for wireless communication between the controller 18 and the memory 16. For example, an infrared communications link or a radio frequency (RF) communications link may be employed between the controller 18 and the memory 16.

The processor 24 in the controller 18 is operative to execute an application program out of the controller memory 26. Additionally, the controller 18 may include a storage device 27 such as a disk drive, a memory stick, compact flash card, secure digital (sd) card, a microdrive, xD picture card, Smart Media, a multimedia card, a USB Flash pen drive or any other suitable storage for storage of sets of setup parameters as subsequently discussed.

The memory 16 associated with the removable tooling component 12 (FIGS. 1,3) contains data defining at least one setup parameter to be employed by the host machine when operating with the removable tooling component 12. By way of example, in the circumstances in which the host machine 2 is a stripper-crimper machine for stripping and terminating wires, or an automatic cut-strip-terminate machine, the stripping parameters for a specific terminal and wire combination as well as other applicable parameters are stored within the memory 16 so as to eliminate the need for the operator to program the host machine 2 or manually select such parameters from the controller memory 26 or storage device 27 for use with a tooling component 12 in the form of a crimping die.

In wire processing, and more particularly, the application of crimp terminals, every terminal requires specific wire processing parameters in order to produce an accurate and acceptable crimp. For example, these parameters may include but are not limited to:
1) Wire gauge
2) Strip length
3) Strip position
4) Delta wayback
5) Trimming
6) Various crimping speeds
7) Wire feed speeds
8) Crimp height
9) Pull force
10) Crimp force In addition to the parameters specified above, the memory 16 may include other processing information. For example, an identifier that is uniquely associated with the removable tooling component 12 may be stored in the memory 16 and used to identify the particular removable tooling component within an inventory of removable tooling components 12. The identifier may also be used to track the tooling component 12 within a production environment. Moreover, the specific setup parameters and information stored in the memory 16 may vary based upon the specific removable tooling component 12 and host machine 2 employed.

Because the setup parameters for some removable tooling components are known at the time the respective component 12 is being manufactured, these parameters can be stored in the memory 16 at the time of manufacture. Thus, when the removable tooling component 12 is shipped to a customer, it is ready for installation and use on the host machine 2. The association of setup parameters with the removable tooling component 12 greatly reduces setup time and eliminates the possibility of incorrect parameters due to errors arising through operator intervention.

Information needed by an operator may be read from the memory 16 associated with the removable tooling component 12 and displayed to the operator by means of the host machine display 6 when the removable tooling component is installed. Moreover, the memory 16 may contain data pertaining to the use of the removable tooling component 12 which may be employed to schedule preventative maintenance for the respective applicator. For example, in the event that the memory 16 is a rewritable memory, a value indicative of the extent of use of the removable tooling component 12 may be written to the memory 16 and updated from time to time by the controller 18. The controller 18 may read the stored value indicative of the extent of use of the removable tooling 12 to determine when maintenance on the component should be undertaken.

Furthermore, different removable tooling components 12 and host machine 2 manufacturers may standardize on a single platform that employs a uniform electrical interface between the memory 16 and the controller 18 and physical interface between the host machine 2 and the removable tooling component 12. By standardizing on a single platform, removable tooling components 12 produced by various manufacturers are useable with host machines 2 and controllers 18 produced by different manufacturers. In addition, because different controllers 18 can utilize different setup parameters and may use different reference points for measuring setup parameters, or even use different units of measure such as Metric vs. English, more than one set of parameters can be stored in the memory associated with the removable tooling component 12. Thus, depending on the particular host machine 2 manufacturer and model, plural data sets containing parameters associated with different host machines 2 can be retrieved from the memory 16 and the controller 18 can select the specific data set to be used in conjunction with a particular host machine 2. Alternatively, the controller 18 may retrieve a selected data set from the memory 16 from a plurality of data sets stored in the memory 16 based upon the identification of the particular host machine 2 with which the removable tooling component 12 is to be used.

If the memory 16 is a rewritable memory, the data stored in the memory 16 can be changed and/or reprogrammed, or programs added should the end user of the removable tooling component 12 acquire new host machines that require the modification of memory 16 contents.

Figure 4:
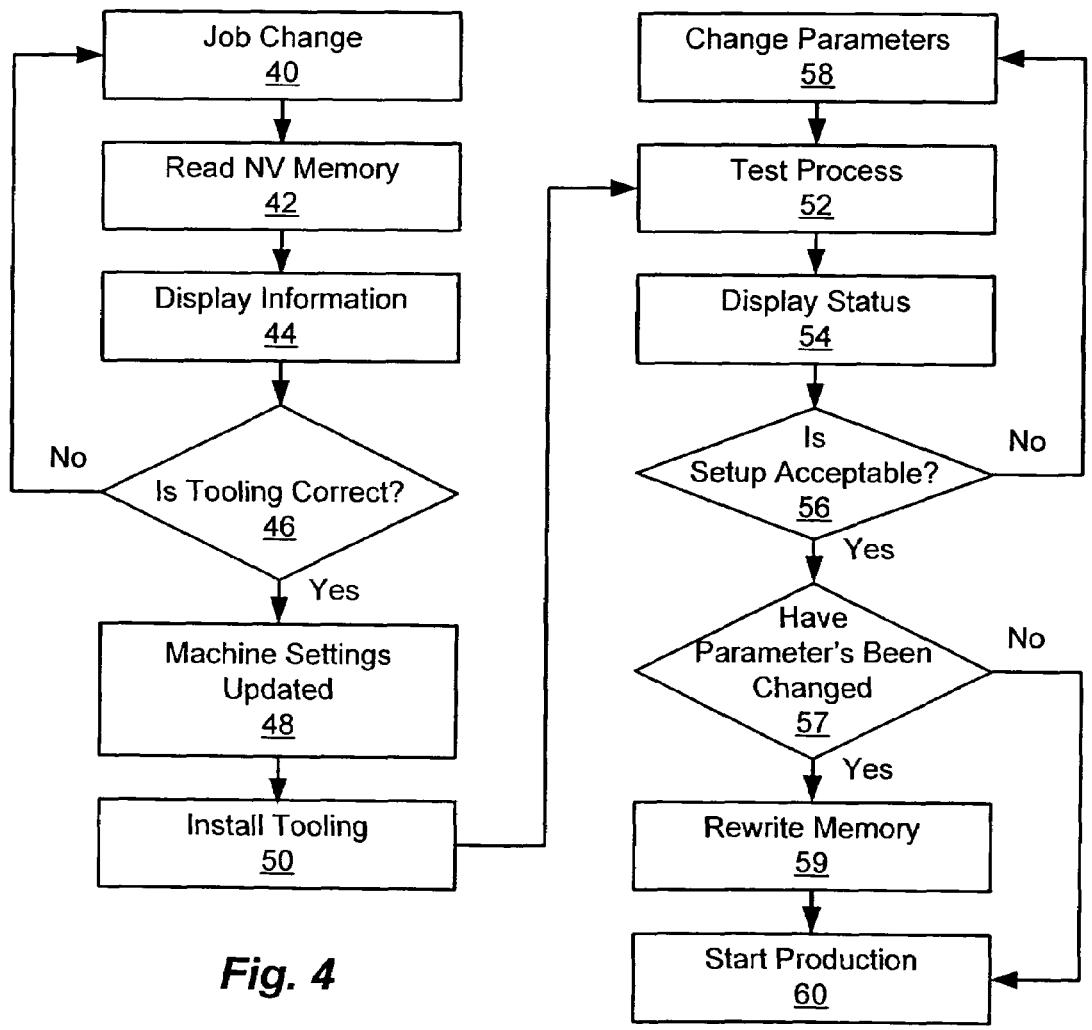
FIG. 4 is a flow diagram depicted an exemplary method in accordance with the present invention.

FIG. 4 depicts a flow chart that illustrates the steps associated with the installation of the removable tooling component 12 on the host machine 2. Referring to FIG. 4, when a need to change or install the removable tooling component 12 is identified, as indicated in step 40, the non-volatile memory 16 is read by the controller 18 that is mounted to the removable tooling component 12, as depicted in step 42. Alternatively, the tooling component 12 may be first mounted to the host machine 2 prior to reading the contents of the memory 16.

In addition to specific setup information defining process parameters, the memory 16 may contain information indicative of the material and/or items that the tooling component 12 is designed for, miscellaneous processing instructions for the operator, one or more serial numbers associated with the component 12 replacement tooling part numbers for the tooling component 12, and additional information that is deemed useful by the customer during the manufacturing process. For example, the memory 16 may contain data defining a graphical image related to a manufacturing process and/or a strip of terminals that is to be employed in the manufacturing process.

The controller 18 then optionally displays on the host machine display 6 information that identifies the tooling component 12 so that an operator can verify that the proper tooling component 12 has been selected as depicted at step 44. Alternatively, the information to be displayed may be displayed on another visual display communicably coupled to the controller 18. The application program then either automatically loads the proper setup parameters for the host machine 2 or prompts the operator to confirm that the removable tooling component 12 that they are installing is in fact the proper tooling for the specific job of interest, as depicted at decision step 46. If the system is configured to automatically load the proper setup parameters, control passes directly to step 48. If the system is configured to require manual confirmation by an operator, the controller 18 awaits a response by the operator to confirm that the proper removable tooling component 12 has been selected. If the operator provides an input via one of the controls 8 or via keyboard (not shown) coupled to the controller 18, that the tooling is incorrect, control passes to step 40. The incorrect tooling is then removed and the proper tooling component 12 is installed. If the operator confirms that the selected tooling component 12 is correct, control passes to step 48.

Upon confirmation by the operator that the correct tooling component 12 has been installed, the setup parameters that were derived from the memory 16 are used to configure the host machine 2 to perform the specific functions for which the removable tooling component was designed, as illustrated in step 48. If the tooling component 12 was not previously mounted to the host machine 2, once it has been confirmed that the correct tooling component 12 has been selected, it is physically mounted to the host machine 2, as illustrated in step 50. Following the configuration of the host machine 2 with the setup parameters for the tooling component 12, a test process is run, as illustrated in step 52, to confirm the proper operation of the host machine 2 with the selected tooling component 12. Information pertaining to the results of the test process may optionally be displayed on the display 6 or alternatively on a visual display screen (not shown) coupled to the controller 18, as depicted at step 54.

As illustrated in decision block 56, a determination is made by the operator whether the setup is acceptable. If the test process 52 yields unacceptable results, the operator can make changes to the operational parameters via a keyboard or other input device as depicted at step 58. Control passes to step 52 and the test process is rerun, as illustrated in step 52. This process continues until acceptable test results are obtained.

If it is determined that the modified settings are superior to the settings derived from the data initially stored in the tooling component memory 16, the controller 18 optionally rewrites the data to the memory 16 (assuming a rewritable memory device is employed) so as to incorporate the changes. Consequently, the next time the tooling component 12 is installed 12, it includes the updated parameters.

Once acceptable processing results are achieved, as depicted in decision block 57, a determination is made whether changes have been made to the parameters retrieved from the memory 16. If no changes have been made to the parameters stored in the memory 16, production is started as depicted in step 60. If it is determined in decision block 57 that changes to the parameters retrieved from the memory 16 were made, the updated parameters are written to the memory 16 (assuming the memory 16 is a re-writable memory) as depicted in step 16 and the production run is initiated, as illustrated in step 60. By re-writing the memory with the updated parameters, the need for operator intervention to correct the parameters the next time the tooling is installed is avoided.

In another embodiment of the invention, the tooling component 12 includes a bar code 70 which may be read by a bar code reader 72 communicably coupled to the controller 18. The processor 24 within the controller 18 then recalls from the memory 26 or the storage device 27 the proper setup parameters for the respective tooling component 12 using the identifying information scanned from the bar code 70 to select the applicable setup parameters from one or more sets of parameters stored in the memory 26 or the storage device 27, as applicable.

In yet another embodiment of the invention, the applicator 12 has a Radio Frequency Identification (RFID) tag that is affixed to or associated with the removable tooling component 12. An RFID tag reader is in communication with the controller 18 and detects the RFID tag when proximate the RFID tag reader. As in the case of the bar code embodiment, the processor 24 within the controller 18 recalls from the memory 26 or the storage device 27 the proper setup parameters for the respective tooling component 12 using the identifying information obtained from the RFID tag as an index to select the applicable setup parameters.

Moreover, it should be recognized that any form of identifier that may be read or detected by the controller may be employed to identify the removable tooling component 12 and select a set of setup parameters for use with the host machine 2.

Figure 5:
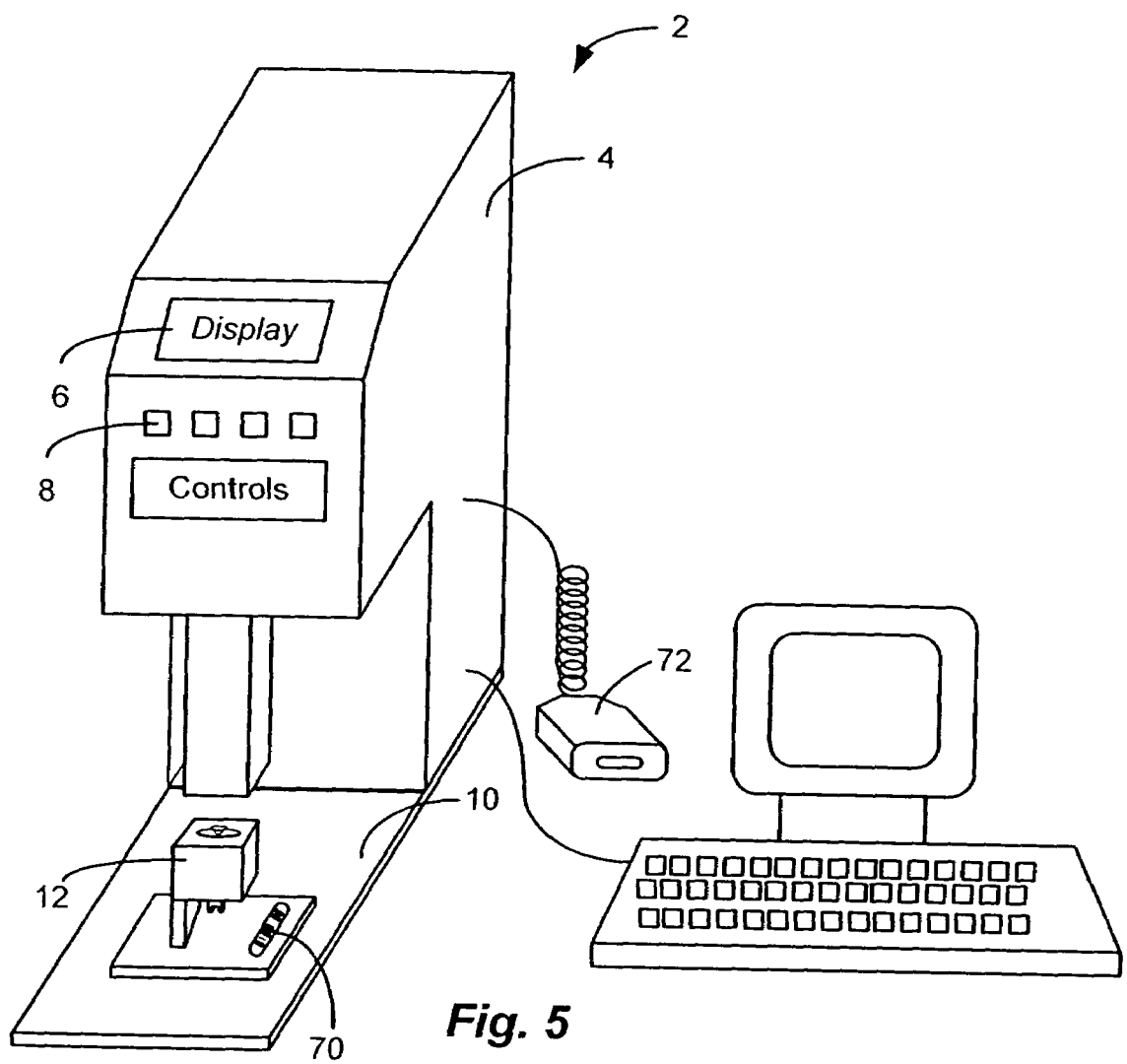
FIG. 5 is a perspective view depicting a system in accordance with the present invention that includes a removable tooling component having reading indicia disposed thereon.

When installing the removable tooling component 12 it is often important to precisely position the component 12 with respect to the machine base plate 10 since variations in the mounting position of the tooling component 12 with respect to the machine base plate 10 can produce variations in results obtained in the manufacturing process using the established setup parameters that are non-uniform or unacceptable. For this reason, a means is described for precisely locating the tooling component 12 on the machine base plate 10. As illustrated in FIG. 5 the machine base plate 10 includes depressible locator pins 71 that are sized to engage corresponding locator holes 72 within the tooling component base plate 14. A spring 74 urges the locator pins 71 upward and out of the upper surface of the host machine base 10. The locator pins 71 can remain depressed below the surface of the machine base plate 10 in the event that a removable tooling component 12 is employed that does not include cooperative locator holes in its base 14. Additionally, removable tooling components 12 with locator holes 72 will function properly in host machines 2 that do not include locator pins 71 in the base plates 10 without the benefit of accurate alignment discussed above.

When the tooling component base plate 14 is aligned in the intended mounting position with respect to the machine base plate 10, the locator pins 71 engage the holes 72 in the underside of the tooling component base plate 14 to precisely align the tooling component 12 with the host machine 2 base plate 10. By accurately positioning the tooling component 12 with respect to the machine base plate 10, excessive variations in production, such as variations in wire strip position in a stripper-crimper machine are avoided. The tooling component base plate 14 is fastened to the host machine base plate 10 via suitable fasteners.

It should be appreciated that the type of host machine 2 and removable tooling component 12 may vary greatly without departing from the inventive concepts herein disclosed. By way of further example, the removable tooling component may comprise a mold usable with a host machine in the form of a molding press. The memory 16 may be associated with the mold and a controller 18 may read the contents of the memory 16 to establish setup parameters used by the molding press or molding machine in a molding operation. Alternatively, the controller 18 may obtain the identity of a removable tooling component 12 and use that identifying information to select setup parameters from a plurality of storage device setup parameters stored in the memory 26 or the storage device 27.

Additionally, in the field of metal stamping, a memory 16 may be associated with a die used with a host machine in the form of a press and a controller 18 may read the contents of the memory 16 to obtain information to establish at least one setup parameter for the press. Alternatively, the controller 18 may obtain the identity of a removable tooling component 12 and use that identifying information to select setup parameters from a plurality of storage device setup parameters stored in the memory 26 or the storage device 27.

The above-described techniques for automating machine setup may also be applied to machines that do not employ removable modular tooling. A reading device such as a bar code reader, an RFID tag scanner or other information retrieval device is coupled to a controller. The controller is in communication with a database that associates setup parameters for the machine and other information with indicia that is readable via the bar code reader, RFID tag scanner or any other suitable reader. Tags that are associated with a particular job or manufacturing operation are affixed to the workpiece or alternatively, to a graphical or textual representatation that informs an operator of the nature of the a particular manufacturing operation. The operator may scan the tag to read the indicia associated with the tag and use the indicia to access the setup parameters for use by the machine. The controller then configures the machine based upon the stored parameters. Similarly, a plurality of setup parameters may be stored in a memory device and the memory device may be associated with a particular manufacturing operation, e.g. by associating the memory device with a graphic or textual representation of a particular manufacturing operation or a particular workpiece. The information contained within the memory may then be accessed by a controller as discussed hereinabove and the machine may be configured based upon the setup parameters retrieved from the memory device. By way of example, a bar code or RFID tag may be affixed to a wire. By scanning the bar code or tag, the operator can obtain indicia or data that is used to automatically configures the machine for a particular operation, such as a mark, measure, cut or stripping process.

The above-described techniques for machine setup remove the need for the operator to be highly knowledgeable about the controller interface thereby allowing workers to set up production machines and produce high quality components without substantial training.

It will be understood by those of ordinary skill in the art that variations to and modifications of the above-described apparatus and methods may be made without departing from the inventive concepts disclosed herein. Accordingly, the invention should not be viewed as limited except by the scope and spirit of the appended claims.

What is claimed is:

1. Wire processing apparatus comprising:
   a wire processing machine having a controller associated therewith;
   an applicator removably mountable to said wire processing machine for attaching a terminal to a wire;
   a readable media that provides an identifier associated with a wire preparation operation to be performed, said readable media attached to said applicator;
   a storage device containing at least one first parameter usable by said controller to produce a prepared wire; and
   a reader for reading said readable media under the control of said controller to obtain said identifier;
   said controller operative to access said storage device using said identifier as an index to obtain said at least one parameter and to control said wire processing machine using said at least one parameter to produce said prepared wire; and
   said wire processing machine being cooperative with said controller and said applicator to perform an attachment operation to attach said terminal to said prepared wire.

2. The apparatus of claim 1 wherein said readable media comprises a bar code and said reader comprises a bar code scanner.

3. The apparatus of claim 1 wherein said readable media comprises an RFID tag and said reader comprises a RFID tag reader.

4. The apparatus of claim 1 wherein said readable media comprises a non-volatile memory.

5. The apparatus of claim 4 wherein said controller and said non-volatile memory include first and second radio frequency interfaces respectively, and said non-volatile memory is readable by said controller via said first and second radio frequency interfaces.

6. The apparatus of claim 5 wherein said controller and said non-volatile memory include first and second infra-red interfaces respectively, and said non-volatile memory is readable by said controller via said first and second infra-red interfaces.

7. The apparatus of claim 5 wherein said controller and said non-volatile memory are communicably coupled via a connector.

8. The apparatus of claim 1 wherein said attachment operation comprises a crimping operation, said applicator comprises crimp tooling and said wire processing machine includes a crimping press cooperative with said crimp tooling to perform said crimping operation to attach said terminal to said prepared wire.

9. The apparatus of claim 1 wherein said prepared wire comprises a stripped wire and said at least one first parameter includes at least one of a strip length defining the length of insulation to be stripped, a wire gauge specifying the gauge of the wire to be processed, a strip position specifying a position of said wire with respect to said terminal, a delta wayback specification, a wire feed speed, and a trimming specification.

10. The apparatus of claim 1 wherein said prepared wire comprises a stripped wire and said at least one first parameter comprises a strip length defining the length of insulation to be stripped, a wire gauge specifying the gauge of the wire to be processed, and a strip position specifying a position of said stripped wire with respect to said terminal.

11. The apparatus of claim 1 wherein said wire processing machine comprises a stripper-crimper machine.

12. The apparatus of claim 1 wherein said wire processing machine comprises a cut-strip-terminate machine.

13. The apparatus of claim 1 wherein said storage device further includes at least one second parameter associated with said attachment operation and said controller is operative to read said at least one second parameter from said storage device and to use said at least one second parameter to control said wire processing machine to attach said terminal to said prepared wire cooperatively with said applicator.

14. The apparatus of claim 13 wherein said attachment operation comprises a crimping operation and said at least one second parameter comprises at least one of a crimp speed, a crimp height, and a crimp force.

15. The apparatus of claim 13 wherein said attachment operation comprises a crimping operation and said at least one second parameter includes a crimp speed, a crimp height, and a crimp force.

16. The apparatus of claim 1 wherein said storage device contains plural data sets, and said controller is operative to access one of said plural data sets using said identifier to obtain said at least one parameter.

17. The apparatus of claim 1 wherein said prepared wire comprises a stripped wire.

18. A method for controlling a wire processing machine comprising:
    attaching a readable media to an applicator;
    reading the readable media to obtain an identifier associated with the applicator;
    mounting said applicator to said wire processing machine;
    accessing at least one first parameter from a storage device using said identifier as an index;
    configuring said wire processing machine to perform a wire preparation operation using said at least one first parameter;
    in a wire preparation step subsequent to said configuring step, producing a prepared wire; and
    attaching a terminal to said prepared wire in a terminal attachment operation.

19. The method of claim 18 wherein step of producing a prepared wire comprises the step of producing a stripped wire and said at least one first parameter comprises at least one of a wire gauge, a strip length, and a strip position.

20. The method of claim 18 wherein said attachment operation comprises a crimping operation, said method further including the steps of:
    storing in said storage device at least one second parameter useable by said controller to configure said wire processing machine for said crimping operation;
    reading said storage device by said controller to obtain said at least one second parameter; and
    prior to said attaching step, configuring said wire processing machine for a crimping operation using said at least one second parameter.

21. The method of claim 19 wherein said attaching step comprises the step of crimping a terminal to said stripped wire and said at least one second parameter comprises at least one of a crimp force, a crimp speed, and a crimp height.

* * * * *

UNITED STATES PATENT AND TRADEMARK OFFICE
CERTIFICATE OF CORRECTION

| | |
|---|---|
| PATENT NO. | : 7,243,516 B2 |
| APPLICATION NO. | : 10/859899 |
| DATED | : July 17, 2007 |
| INVENTOR(S) | : Christopher J. Zusi |

It is certified that error appears in the above-identified patent and that said Letters Patent is hereby corrected as shown below:

Title Page; (74) *Attorney, Agent, or Firm,* "Weigarten" should read --Weingarten--.

Signed and Sealed this

Fifteenth Day of April, 2008

JON W. DUDAS
*Director of the United States Patent and Trademark Office*